United States Patent [19]

Horning et al.

[11] 4,166,694
[45] Sep. 4, 1979

[54] METHOD FOR OPTICALLY DISTORTING READOUT RETICLES

[75] Inventors: John E. Horning, Churchville; Roy R. Radzai, Roslyn, both of Pa.; John R. Hagstrom, Key Largo, Fla.

[73] Assignee: The United States of America as represented by the Secretary of the Navy, Washington, D.C.

[21] Appl. No.: 890,891

[22] Filed: Mar. 28, 1978

[51] Int. Cl.$^2$ .................... G03B 27/32; G03B 27/68
[52] U.S. Cl. ................................. 355/77; 340/378.2; 353/94; 354/292; 355/47; 355/52
[58] Field of Search ................ 355/52, 46, 47, 77; 353/34, 25, 74, 94; 354/292; 340/378.2

[56] References Cited

U.S. PATENT DOCUMENTS

| | | | |
|---|---|---|---|
| 2,786,388 | 3/1957 | O'Brien et al. | 355/52 X |
| 2,931,027 | 3/1960 | Blefary et al. | 340/378.2 X |
| 3,286,585 | 11/1966 | McCullough et al. | 353/94 X |

Primary Examiner—Richard A. Wintercorn
Attorney, Agent, or Firm—R. S. Sciascia; Henry Hansen

[57] ABSTRACT

A method for preparing distortion-compensated images on film reticles for use in a plural optical projector readout unit. An oversized matrix of the images is prepared with each legend proportionately positioned in the field of view corresponding to one of the plural optical projectors. A very short focal length lens having one surface flat and the other convex is placed over the matrix with the flat surface adjacent thereto. The images, distorted through the lens, is photographed to produce a film reticle in a size suitable for use in the readout unit. The spherical aberration induced by the lens closely approximates the barrel distortion from the off-axis projection and magnification in the readout unit. In this manner, the image projected on the screen from the film reticle proportionately corresponds to the images in the matrix.

4 Claims, 6 Drawing Figures

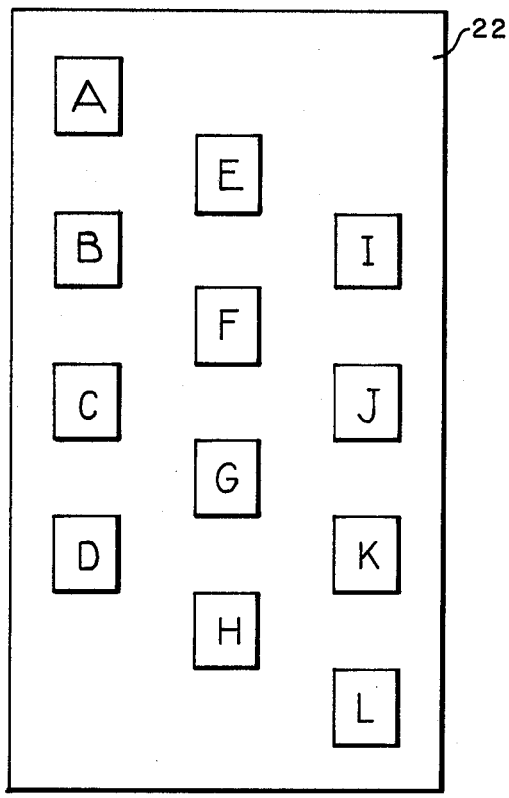
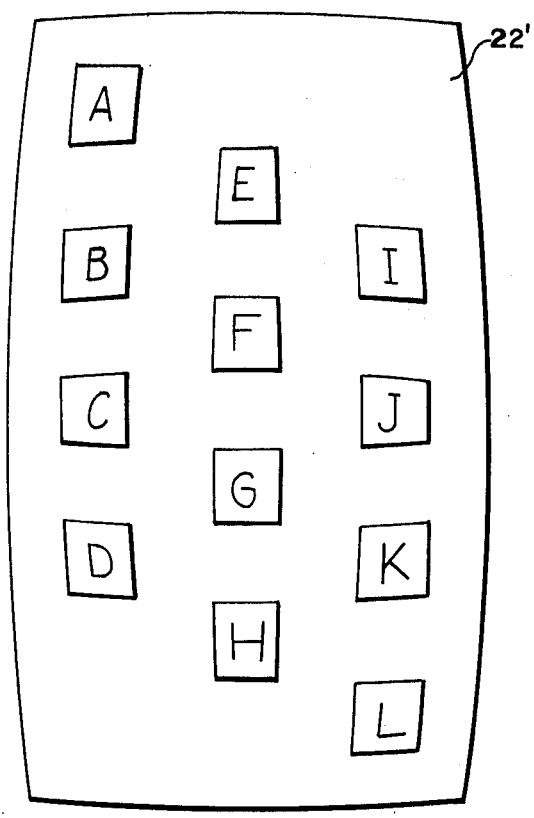
FIG. 4                    FIG. 6

METHOD FOR OPTICALLY DISTORTING READOUT RETICLES

STATEMENT OF GOVERNMENT INTEREST

The invention described herein may be manufactured and used by or for the government of the United States of America for governmental purposes without the payment of any royalties thereon or therefor.

BACKGROUND OF THE INVENTION

The present invention relates to a method for compensating distortion in optical projection and more particularly to a method for producing a distortion-compensated reticle having multiple legends for optical projection on a single screen readout unit.

Film reticles or chips having multiple legends are commonly used for readout on instrument and control panels and are often integrated into keysets. The legends are usually formed in a transparent film matrix and singularly projected to the backside of a single translucent screen by a plurality of separately operated parallel projectors. The projectors are operated according to the legend to be displayed. Due to so-called barrel distortion (pin-cushioning and keystoning) caused by magnification and displacement of the projectors off of the center of the screen, the legends at the reticle must be distorted in order that the projected image will appear undistorted. Various methods for predistorting the legends have been utilized. For example, a single photosensitive film is placed in a camera having plural optical paths from a single objective to separate image areas on the film corresponding to the separate legend areas on the reticle of the readout unit. The separate areas are each exposed one at a time to a desired legend by blanking out all but the corresponding optical path. In this way, the images developed on the film are distorted precisely the amount necessary to compensate for the barrel distortion when projected on corresponding optical paths of a readout unit. Because each legend must be separately photographed on a single film along each optical path, the reticle production is time-consuming and expensive.

SUMMARY OF THE INVENTION

Accordingly, the object of the present invention is to provide a method for simultaneouly photographing a plurality of legends on a single film reticle suitable for use on readout units.

Another object of the invention is to provide a method for predistorting images on a film reticle to compensate for the pin-cushion and keystoning effects caused by magnification and displacement of a plural projection system.

Still another object of the invention is to provide a method for quickly and easily preparing barrel distortion compensated film reticles.

Briefly, these and other objects of the invention are accomplished by preparing an oversized layout of a plurality of legends required for a single readout unit. Each legend is proportionately positioned in a matrix corresponding to one optical projection path. A very short focal length lens having one surface flat and the other convex is placed over the layout with the flat surface against the layout. The legends, distorted through the lens, are simultaneously photographed on one film and reduced (or enlarged) to fit in the readout unit. The spherical aberration induced by the lens closely approximates the barrel distortion from the off-axis projection and lens magnification in the readout unit.

Other objects, advantages and novel features of the invention will become apparent from the following detailed description of the invention when considered in conjunction with the accompanying drawings wherein:

BRIEF DESCRIPTION OF THE DRAWINGS

FIG. 4 is an enlarged layout of exemplary legends suitable for photographing in the apparatus of FIG. 4;

FIG. 6 represents a film reticle, greatly enlarged, produced by the apparatus of FIG. 5.

DESCRIPTION OF THE PREFERRED EMBODIMENT

Figure 1:
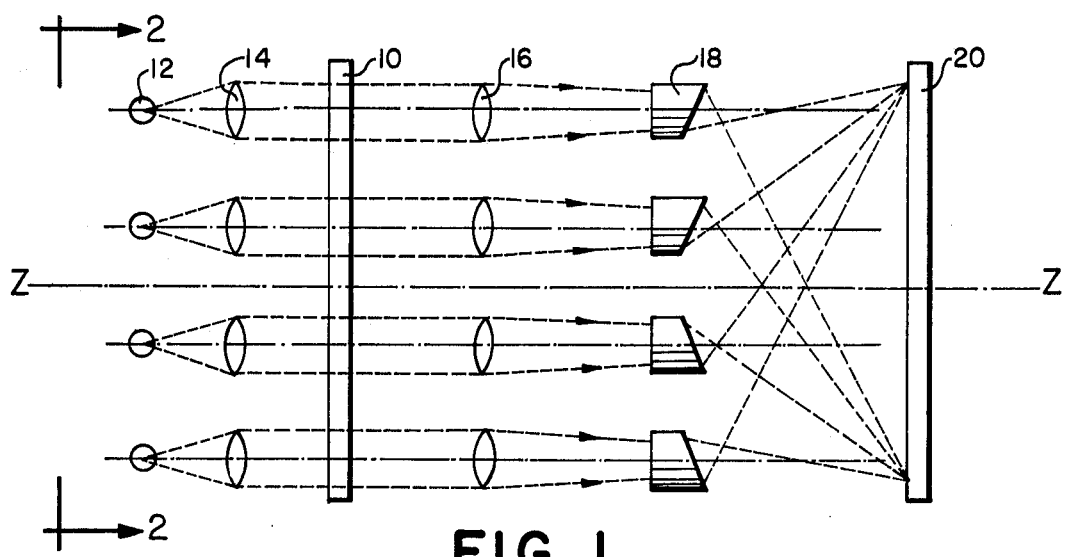
FIG. 1 is a diagrammatic view of a plural legend readout unit suitable for using a film reticle prepared according to the invention.
Figure 2:
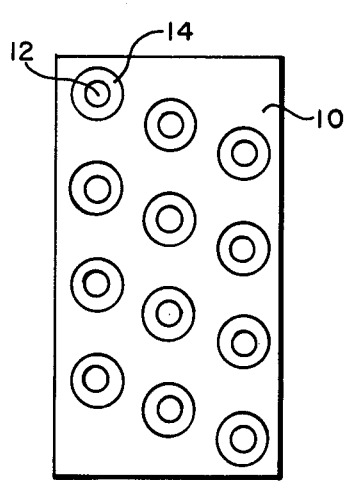
FIG. 2 is a view of the readout unit taken along the line 2—2 of FIG. 1.
Figure 3:
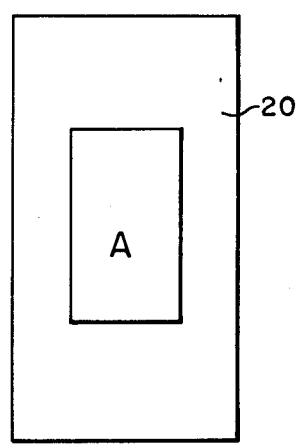
FIG. 3 is a typical legend projected on the screen of FIG. 1.

Referring now to the drawings, wherein like reference characters designate like or corresponding parts throughout the several views, there is illustrated in FIG. 1 a typical plural legend readout unit suitable for use with a film reticle or chip 10 made according to the invention. As can be seen in the view of FIG. 2, the readout unit includes a matrix of twelve parallel optical paths at each of a plurality of light sources 12. Each path includes optical lenses 14 and 16 and a prism 18 for projecting a discrete legend area of the reticle 10 over the whole screen 20. Due to the lateral displacement of the optical paths from the center line ZZ normal to the screen, and due to lens magnification, the keystoning and pin-cushioning effects distorts the projected legend. In order to project legends on screen 20 in a desired linearity such as shown in FIG. 3, the legends formed on reticle 10 are distorted.

Referring now to FIG. 4, there is illustrated a drawing or layout 22 of twelve right rectangles A–L positioned in areas corresponding to the position of the optical paths in the readout unit of FIGS. 1 and 2. Of course, it is understood that any legend or symbol may be illustrated, and that rectangles are used here for more readily illustrating the resulting distortion in the reticle 10 according to the invention.

Figure 5:
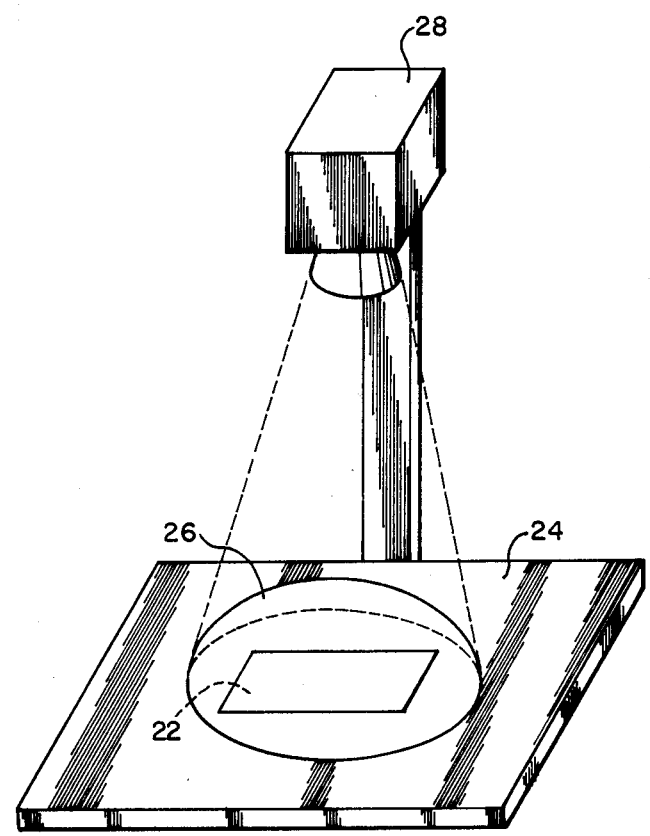
FIG. 5 is a schematic representation of a photographic apparatus used in preparing the reticle in FIG. 1.

Layout 22 is then placed on a flat surface 24 of the photographic apparatus of FIG. 5 and a very short focal length lens 26, having one surface flat and the other convex, is placed over the layout 22 with the flat surface adjacent to the layout 22. Lens 26 is selected with a focal length and diameter sufficient to induce a spherical aberration closely approximating the barrel distortion of the off-axis projection and lens magnification in the readout unit of FIG. 1. A suitable lens for a 3 inch by 5 inch layout was found to be 8 inches in diameter with an approximately 4 inch focal length. For the rectilinear layout 22 illustrated in FIG. 4, the spherical aberration is as shown by the curvilinear image 22' in FIG. 6. This image is reproduced on photosensitive film in camera 28 and photographically developed into a reticle size acceptable to the readout unit of FIG. 1.

Thus, a film reticle is produced having a plurality of predistorted legends compensating for the barrel distortion in the readout unit of FIG. 1 is produced. The film is quickly and easily produced by one exposure of an entire legend layout on a single film reticle.

It will be understood that various changes in details, materials, steps and arrangements of parts, which have herein been described and illustrated in order to explain the nature of the invention may be made by those skilled in the art within the principal and scope of the invention as expressed in the appended claims.

What is claimed is:

1. A method of preparing a film reticle having a plurality of legends thereon for a readout unit having a corresponding plurality of optical projectors and a flat screen therefor, comprising the steps of:
   preparing an undistorted flat layout of a plurality of legends arranged according to the corresponding position of the optical projectors of the readout unit;
   exposing the layout on a photosensitive film through a very short focal length lens having a flat side adjacent to the layout; and
   developing the photograhic image on said film into a film reticle of a size and configuration acceptable in the readout unit;
   whereby the resulting film bears distorted images of the legends equal to the barrel distortion of the readout unit.

2. A method according to claim 1 wherein the lens is selected with a focal length and diameter sufficient to induce spherical aberrations closely approximating the barrel distortion.

3. A method of preparing a barrel distortion compensated film reticle having a plurality of legends thereon for a readout unit having a corresponding plurality of optical projectors and a flat screen therefor, comprising:
   exposing a photosensitive film through a very short focal length lens to an undistorted flat layout of legends arranged according to the corresponding area projected by the respective projectors of the readout unit; and
   developing the photographic image on said film into a film reticle in size and configuration acceptable to the readout unit.

4. A method according to claim 3 wherein the lens is selected with a focal length and diameter sufficient to induce spherical aberrations closely approximating the barrel distortion.

* * * * *